United States Patent [19]

Lomax et al.

[11] 4,399,198

[45] Aug. 16, 1983

[54] LINING ALLOY FOR BIMETALLIC CYLINDERS

[76] Inventors: Donald P. Lomax, 649 Stourbridge Pl., P.O. Box 232; Ronald M. Boggs, P.O. Box 253, both of Wales, Wis. 53183

[21] Appl. No.: 284,631

[22] Filed: Jul. 20, 1981

[51] Int. Cl.³ .................... B32B 15/18; C22C 30/00
[52] U.S. Cl. .................... 428/595; 420/580; 428/678; 428/679; 428/684; 148/442
[58] Field of Search .................... 428/678–685, 428/627, 595; 164/113; 75/134 F, 171, 239, 240, 242; 148/442; 420/580

[56] References Cited

U.S. PATENT DOCUMENTS

| | | |
|---|---|---|
| 2,046,914 | 7/1936 | Kormann et al. |
| 2,049,913 | 7/1936 | Kormann et al. |
| 3,658,515 | 4/1972 | Saltzman |
| 4,089,466 | 5/1978 | Loman et al. |
| 4,312,894 | 1/1982 | Brown ................... 75/239 |

*Primary Examiner*—Michael L. Lewis

[57] ABSTRACT

A wear and corrosion resistant alloy for lining cylinders used in extrusion and injection molding machines comprises at least two carbides admixed with a nickel-cobalt base alloy. The cylinder lining is preferably prepared by placing a quantity of the alloy in the cylinder and capping the ends of the cylinder. The cylinder is then heated above the melting point of the alloy and spun at a high rate of speed to centrifugally coat the inner surface of the cylinder. The cylinder's end caps are then removed and the lining finished to the correct internal diameter and finish by conventional lathe and hone means. The carbide mixture is evenly dispersed in the lining and produces a lining having desirable hardness and corrosion resistance throughout the thickness of the lining.

6 Claims, No Drawings

LINING ALLOY FOR BIMETALLIC CYLINDERS

FIELD OF THE INVENTION

This invention relates generally to hard, wear and corrosion resistant alloys and more particularly to alloys useful for preparing linings for steel cylinders employed in extrusion and injection molding equipment.

BACKGROUND OF THE INVENTION

Extrusion and injection molding of plastic and other materials has become increasingly important in the last forty years or so. In the process, extrusion screws force a molding material through specially shaped dies to produce a wide variety of products. The screws are usually housed in steel cylinders.

The basic process and equipment for carrying out the process were refined in a number of ways in the early stages of development but one problem which has still not been completely overcome is wear and corrosion of the steel cylinders, and the problem has become more pronounced in recent years with the advent of new fillers for plastics. Many of such fillers are themselves abrasive and contribute to the wear of the cylinders and the screws.

A promising contribution to the development of a cure for the excessive wear problem is the bimetallic cylinder. Kormann and Hirsch were pioneers in this development in the early 1930's and some of their work is described in United States Letters Pat. Nos. 2,049,913 and 2,046,914, each issued on July 7, 1936. The process described in these patents includes placing the steel cylinder in a horizontal position and loading the cylinder with a preselected quantity of an alloy having a melting point less than the melting point of the cylinder itself.

The ends of the cylinder are then plugged by welding caps over them and the cylinder is gradually heated to the melting point of the lining alloy. The cylinder is rapidly spun about its axis to centrifugally spread the melted lining alloy over the inner surface of the cylinder. After the cylinder is cooled, the end caps are removed and lathes and hones are used to finish the inside surface of the lining to the desired diameter and smoothness.

Kormann and Hirsch employed ferrous alloys as their cylinder lining, e.g. the one described in U.S. Pat. No. 2,046,913. This alloy includes carbon from about 2½–3½%, boron 0.75–1¼%, nickel 2½–6%, less than 1¼% silicon and trace amounts of sulphur and phosphorus in addition to iron. The percentages are weight percentages.

Another ferrous alloy developed for use in bimetallic cylinders is described in Saltzman U.S. Pat. No. 3,658,515 issued Apr. 25, 1972. This alloy preferably includes from 3.3–3.9% carbon, 0.75–1.25% boron, 1.2–1.6% manganese, 0.65–1.10% silicon, 4.1–5.0% nickel, 0.9–1.4% chromium, up to 0.5% molybdenum and the balance iron.

While these ferrous alloys have hardnesses in the approximate range of 58–64 Rockwell C in their centrifugally cast state and possess good wear resistance to abrasive plastic fillers, the ferrous materials exhibit poor corrosion resistance. In fact, the high ferrous content under corrosion conditions has the effect of causing some plastics to decompose under extrusion conditions. Some ferrous alloys were developed which had improved corrosion properties, but those alloys had lower hardness characteristics.

To overcome these new problems, a series of non-ferrous bimetallic cylinder lining alloys have been developed. These typically include about 40% nickel, 45% cobalt, 8% chromium and 3% boron in addition to minor amounts of carbon, manganese, silicon, boron. While these alloys have superior corrosion resistance, they do not have wear and abrasion characteristics required for the bimetallic cylinder apparatus.

A recent modification of the non-ferrous alloys comprises mixing tungsten carbide particles with the non-ferrous material at the time it is inserted into cylinder. A typical composition includes 30–40% tungsten carbide, 22–61% nickel, up to 37% cobalt, up to 12% chromium 1.3–3.0% boron and smaller amounts of iron, silicon, manganese and carbon. The tungsten carbide alloy when centrifugally cast includes higher concentrations of discrete tungsten carbide particles adjacent the interface between the lining and the steel backing, and the inner surface of the lining is relatively easy to finish and has fairly good abrasion and corrosion properties. However, because the tungsten carbide concentration varies throughout the thickness of the lining, the cylinders are subject to uneven rates of wear during use and the discrete tungsten carbide particles have a sandpaper-like effect on the extrusion screws. More recently a tantalum carbide alloy has been found to be highly desirable as described in U.S. Pat. No. 4,089,466 issued May 16, 1978 to the present inventors and entitled "Lining Alloys for Bimetallic Cylinders." The alloy described in this patent contains between 10 and 35% weight percent tantalum carbide in a matrix alloy company 0.16 to 0.35 carbon, 28.5–34.6 nickel, 0.34–0.75% manganese, 0.75–1.90 silicon, 2.75–2.90 boron, 4.50–7.50 chromium and 28.5–42.0 weight percent cobalt. While this material overcame the above noted disadvantages of the tungsten carbide lining alloys, it has become economically impractical due to the high cost of the tantalum carbide.

OBJECTS OF THE PRESENT INVENTION

It is a primary object of the present invention to provide a wear and corrosion resistant alloy.

Another object of the present invention is to provide a wear and corrosion resistant alloy particularly well suited for use as a lining alloy for extrusion and injection molding cylinders.

Yet another object of the present invention is to provide a non-ferrous cylinder lining containing a mixture of at least two carbides in amounts sufficient to provide a lining having improved corrosion and wear resistance throughout its thickness.

How these and other objects of the invention are accomplished will be described in detail in the following specification. Generally, however, they are accomplished by providing a novel lining alloy for bimetallic cylinders which includes about 12–27 weight percent of a carbide mixture in a nickel cobalt alloy. The preferred carbide mixture includes at least 8 weight percent vanadium carbide and at least 2 weight percent tungsten carbide but may in addition contain small proportions of titanium carbide and tantalum carbide. A lining produced from this material has even wear characteristics and desirable corrosion resistance.

DESCRIPTION OF THE PREFERRED EMBODIMENT

The nickel-cobalt and carbide mixture alloy of the present invention may be selected from those alloys described in the following chart, but it should be remembered that trace amounts of other elements might be found in such alloys so that the list of ingredients and the indicated ranges of weight percentages should not be considered as limiting but rather approximate proportions for the required alloying materials.

| Ingredient | Weight Percent |
| --- | --- |
| Carbon | 0.16 to 0.35 |
| Nickel | 28.50 to 34.60 |
| Manganese | 0.34 to 0.75 |
| Silicon | 0.75 to 1.90 |
| Chromium | 4.50 to 7.50 |
| Boron | 2.25 to 2.90 |
| Cobalt | 28.50 to 42.00 |
| Carbide Mixture | 12.00 to 27.00 |

The Carbide Mixture should include at least 8 weight percent vanadium carbide and at least 2 weight percent tungsten carbide and may additionally contain smaller amounts of titanium and tantalum carbide. The carbide mixture should represent between about 12 to about 27% of the overall alloy mixture and may be selected from the following chart:

| | |
| --- | --- |
| VaC | at least 8 to 15% weight percent |
| WC | at least 2 to 7 weight percent |
| TiC | 1-3 weight percent |
| TaC | 1-3 weight percent |

One preferred non-ferrous alloy of the present invention includes the following materials fused together in the approximate proportions shown below.

| Ingredient | Weight Percent |
| --- | --- |
| Carbon | .27 |
| Nickel | 32.82 |
| Manganese | .60 |
| Silicon | 1.19 |
| Chromium | 6.80 |
| Boron | 2.60 |
| Cobalt | 36.72 |
| Vanadium Carbide | 12.00 |
| Tungsten Carbide | 4.00 |
| Titanium Carbide | 2.00 |
| Tantalum Carbide | 1.00 |

While it is possible and within the scope of the present invention to add the carbide mixture in finely divided form to the nickel-chromium base materials at the time the cylinder is to be lined, the preferred method for employing the alloy is to fuse the material together prior to the cylinder lining step. Following the preparation of the fused alloy, the alloy is then subdivided into pellet, shot or some other divided form for use in the cylinder lining process.

A steel cylinder to be lined is finished to the desired internal diameter and the alloy according to the present invention is placed in its cylindrical cavity. The quantity of alloy lining material is usually selected so that the rough spun coating will be slightly thicker than the desired final coating.

The cylinder is then capped by welding metal plates over the ends and is heated in a furnace above the melting point of the alloy (i.e., to approximately 2100 F.). The cylinder is then removed from the furnace and rapidly spun on rollers to centrifugally spread the melted alloy over the inside of the steel cylinder. The coated cylinder is cooled during the spinning cycle and the entire cylinder assembly is then placed in a bed of insulating material (e.g. sand, silica or the like) for a controlled cooling period to assure a good bond to the steel backing and to minimize cracking.

The final steps in the process are the removal of the end caps and finishing by lathes and hones in the customary manner.

The properties of the alloy according to the present invention are set forth below:

| | |
| --- | --- |
| Macro-Hardness | 49–55 Rc |
| Micro-Hardness | |
| - carbides (18.3% Carbide) | 1000–1100 |
| - Vickers matrix | 52 Rc |
| Nominal Tensile Strength | 36,000/53,000 psi |
| Nominal Compressive Strength | 250,000 psi |
| Strain to Fracture | 0.20% |
| Density | 0.309 lb/in$^3$ |

These properties are practically identical to those obtained in the alloy of the aforementioned U.S. Pat. No. 4,089,466, but surprisingly the comparable results are achieved even though 18.3 weight percent carbides were employed in the test mixture while the prior patent's composition included 25.00 weight percent carbides.

Quite unexpectedly, the mixture of carbide materials added here are evenly dispersed throughout the matrix lining and the density of the overall carbide mixture can be adjusted if the base alloy is adjusted to optimize the benefits obtained from the mix.

While the alloy of the present invention has been described particularly in reference to use as the lining alloy for bimetallic cylinders, it should be apparent to one skilled in the art that the alloy's desirable hardness and corrosion resistant properties render it useful in numerous other applications. For example, mixers can be lined with the alloy material. So while the invention has been described in connection with a preferred embodiment it is not to be limited thereby but is to be limited solely by the claims which follow.

We claim:

1. A hard, wear and corrosion resistant alloy consisting essentially of the following materials fused together in the weight percentage composition stated below:

| Ingredient | Weight Percent |
| --- | --- |
| Carbon | 0.16 to 0.35 |
| Nickel | 28.50 to 34.60 |
| Manganese | 0.34 to 0.75 |
| Silicon | 0.75 to 1.90 |
| Chromium | 4.50 to 7.50 |
| Boron | 2.25 to 2.90 |
| Cobalt | 28.50 to 42.00 |
| Vanadium Carbide | 8.00 to 15.00 |
| Tungsten Carbide | 2.00 to 7.00 |
| Titanium Carbide | 1.00 to 3.00 |
| Tantalum Carbide | 1.00 to 2.00 |

2. A hard, wear and corrosion resistant alloy consisting essentially of the following materials fused together in the weight percentage composition stated below:

| Ingredient | Weight Percent |
|---|---|
| Carbon | .27 |
| Nickel | 32.82 |
| Manganese | .60 |
| Silicon | 1.19 |
| Chromium | 6.80 |
| Boron | 2.60 |
| Cobalt | 36.72 |
| Vanadium Carbide | 12.00 |
| Tungsten Carbide | 4.00 |
| Titanium Carbide | 2.00 |
| Tantalum Carbide | 1.00 |

3. In combination, a steel cylinder and a lining for said cylinder consisting of a hard, wear and corrosion resistant alloy consisting essentially of the following materials in the weight percentage composition stated below:

| Ingredient | Weight Percent |
|---|---|
| Carbon | 0.16 to 0.35 |
| Nickel | 28.50 to 34.60 |
| Manganese | 0.34 to 0.75 |
| Silicon | 0.75 to 1.90 |
| Chromium | 4.50 to 7.50 |
| Boron | 2.25 to 2.90 |
| Cobalt | 28.50 to 42.00 |
| Vanadium Carbide | 8.00 to 15.00 |
| Tungsten Carbide | 2.00 to 7.00 |
| Titanium Carbide | 1.00 to 3.00 |
| Tantalum Carbide | 1.00 to 2.00 |

4. The invention set forth in claim 3 wherein said alloy has the following composition:

| Ingredient | Weight Percent |
|---|---|
| Carbon | 0.25 |
| Nickel | 30.40 |
| Manganese | 0.55 |
| Silicon | 1.10 |
| Chromium | 6.30 |
| Boron | 2.40 |
| Cobalt | 34.00 |
| Vanadium Carbide | 12.00 |
| Tungsten Carbide | 4.00 |
| Titanium Carbide | 2.00 |
| Tantalum Carbide | 1.00 |

5. The invention of claim 3 wherein said lining is a centrifugally cast lining of said alloy.

6. The invention of claim 3 wherein the concentration of carbides is substantially constant throughout the thickness of said alloy lining.

* * * * *